V. J. VITEK.
MOWING MACHINE FOR SUGAR CANE.
APPLICATION FILED APR. 10, 1915.
1,152,994.
Patented Sept. 7, 1915.
2 SHEETS—SHEET 1.
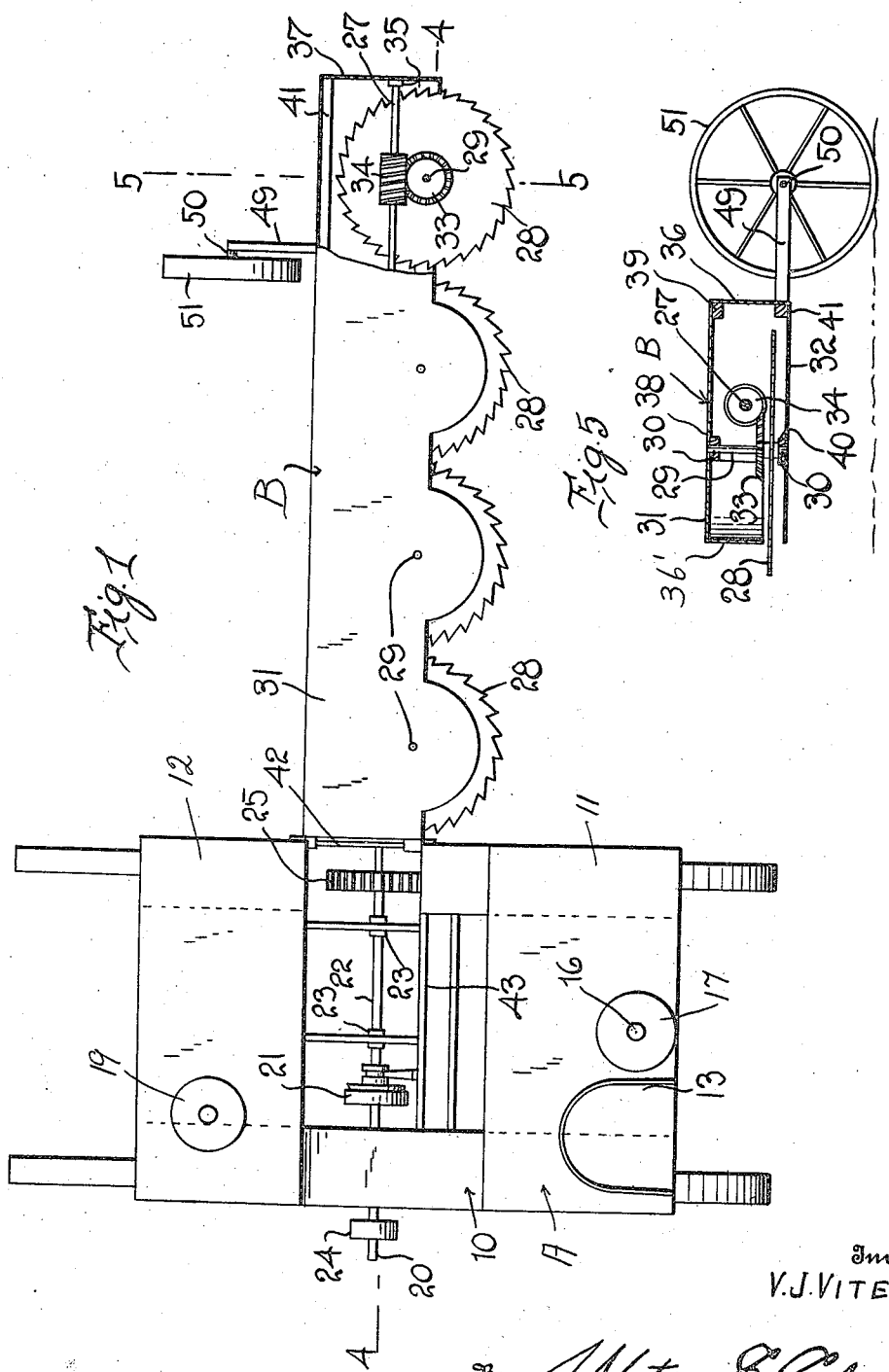
Inventor
V. J. VITEK
By Watson E. Coleman
Attorney

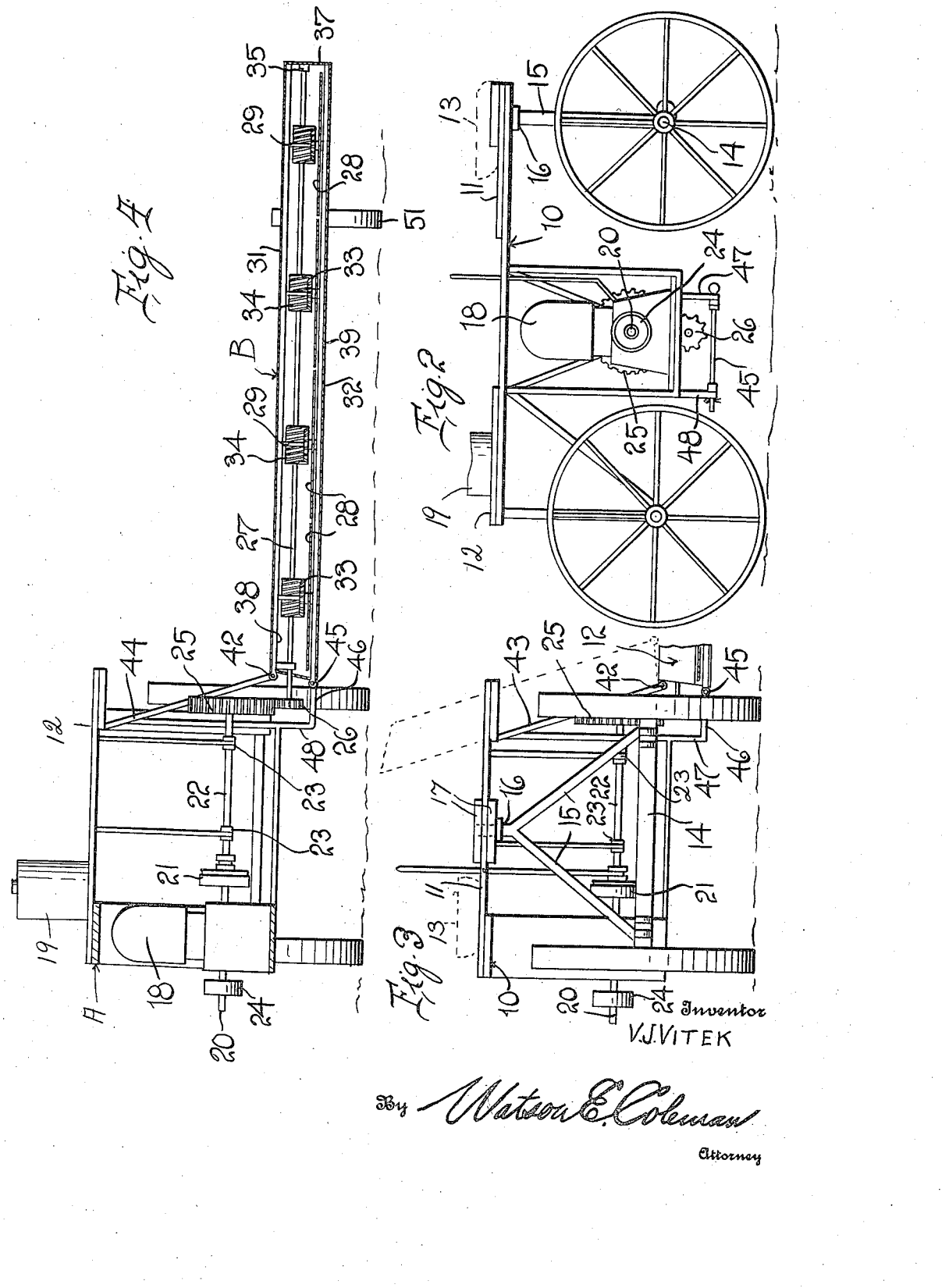

UNITED STATES PATENT OFFICE.

VACLAV J. VITEK, OF CINCINNATI, OHIO.

MOWING-MACHINE FOR SUGAR-CANE.

1,152,994.  Specification of Letters Patent. Patented Sept. 7, 1915.

Application filed April 10, 1915. Serial No. 20,505.

*To all whom it may concern:*

Be it known that I, VACLAV J. VITEK, a subject of the Emperor of Austria-Hungary, and a resident of the United States, residing at Cincinnati, in the county of Hamilton and State of Ohio, have invented certain new and useful Improvements in Mowing-Machines for Sugar-Cane, of which the following is a specification, reference being had to the accompanying drawings.

The present invention relates to new and useful improvements in mowing machines or harvesters of the type which are designed particularly for use in cutting sugar cane.

The primary object of the invention is to provide a harvester of this character in which the cutter bar is constituted by a plurality of circular saws driven by a common shaft which is operatively connected to a gas engine mounted in the wheel supporting frame, by which the cutter is carried.

A further object is to provide a novel locking means, whereby the cutter bar may be held in operative horizontal position and against upward swinging movement to inoperative position.

Another object is to provide a cane harvester which is constructed with all due regard to simplicity and may, therefore, be cheaply manufactured and one which will be durable and efficient in service.

The above, and other incidental objects of a similar nature which will be hereinafter more specifically treated, are accomplished by such means as are illustrated in the accompanying drawings, described in the following specification and then more particularly pointed out in the claims which are appended hereto and form a part of this application.

With reference to the drawings, wherein there has been illustrated the preferred embodiment of this invention, as it is reduced to practice, and throughout the several views of which similar reference numerals designate corresponding parts, Figure 1 is a top plan view of the machine, a portion of the cutter beam casing being broken away; Fig. 2 is a side elevation looking at that side of the machine in which the engine is mounted; Fig. 3 is a front end view; Fig. 4 is a section on the line 4—4, of Fig. 1; and Fig. 5 is a section on the line 5—5, of Fig. 1.

As embodied in the accompanying drawings, the cane harvester of the present invention includes a wheel supporting frame A, and a cutter beam designated as an entirety by the letter B. The frame A includes the longitudinal members 10 and the transverse platform 11.

At the forward end of the frame 10, on the platform 11, is mounted the driver's seat 13. Extending upwardly from the front axle 14, are a pair of diagonal rods 15, the upper ends of which connect with a vertical king pin 16. The upper terminal of this member 16 extends through the front platform 11 and carries a pair of disks 17 by which the pin is held against withdrawal from the member 11. Standards 12 support the rear end of the frame over the rear wheels. Mounted in the wheel supporting frame 10 is a gas engine 18 which is preferably of the single cylinder two-cycle type. A gasolene tank indicated at 19 is carried at the rear end of the platform 11 for supplying fuel to the engine. The crank shaft 20 of the engine is operatively connected by a friction clutch 21 to a transversely disposed jack shaft 22 mounted in suitable bearings 23. A shift lever 21' is provided for the clutch. A belt wheel 24 is carried by the outer end of the engine crank shaft so that power from the engine may be utilized for driving other farm machinery, when desired. The outer end of the jack shaft 22 carries a pinion 25, which meshes with a pinion 26 keyed on the drive shaft 27 by which the cutting saws 28 are driven. These cutting saws 28 are circular in shape and are keyed on vertically disposed axles 29 which are terminally journaled in bearings 30 carried by the top and bottom walls 31 and 32 of the cutter beam. Each axle carries a pinion 33, the teeth of which are helical and are adapted to mesh with the worm gears 34 keyed on the drive shaft. The outer terminal of the drive shaft is journaled in a bearing 35 secured to the end wall of the cutter beam. The cutter beam heretofore designated as an entirety by the letter A consists of the parallel top and bottom walls 31 and 32, the rear wall 36, front wall 36' and the end wall 37.

The front wall 36' is shaped to produce a number of longitudinally spaced scallops and the top wall 31 is provided with semi-circular extensions which aline with these scallops. It will be seen particularly upon reference to Figs. 1 and 5, that a cover is thus provided for each saw and that the straight portions between the scallops of the front wall, serve as abutting surfaces against which the cane may be forced by the saws. Four bars or rods 38, 39, 40 and 41 are mounted on the inner faces of the top and bottom walls, as disclosed in Fig. 5 to impart to the casing, which constitutes the cutter beam, sufficient rigidity. The inner ends of the members 38 and 39 are hinged on a rod 42 which is carried by a pair of diagonally disposed, downwardly extending rods or bars 43 and 44 secured to the frame 10. Thus it will be seen that the cutter beam may be swung upwardly and disposed above the wheeled frame when not in use, in the manner indicated by dotted lines in Fig. 3.

As a means for normally holding the cutter beam in horizontal position, so that it may not swing upwardly when not in use, I employ a locking rod 45 which is adapted to connect the eyelets at the inner ends of the rods 40 and 41 with the horizontally directed portions 46 of the rods or bars 47 and 48 carried by the frame 10. This rod may be quickly withdrawn to permit the raising of the cutter beam.

Adjacent the outer or free terminal of the cutter beam, there is secured to the bottom wall 32 a rearwardly extending bar 49 to the rear terminal of which is secured, by an axle 50, a ground wheel 51. This wheel 51 serves to support the outer end of the cutting beam, as will be readily discerned, upon reference to Fig. 1.

From the foregoing description, it will now be apparent that I have provided a cane harvester which is relatively simple in construction and is so designed as to be of minimum weight. It will be seen that the rotating circular saws will efficiently sever the cane stalks adjacent the ground and will, in so doing, require a minimum amount of actuating power.

In reduction to practice, it has been found that the form of this invention illustrated in the drawings, and referred to in the above description, as the preferred embodiment is the most practical; yet realizing that the conditions concurrent with the adoption of this device will necessarily vary, it is desirable to emphasize the fact that the various minor changes in details of construction, proportion and arrangement of parts may be resorted to, when required, without sacrificing any of the advantages of this invention, as defined in the appended claims.

What is claimed is:—

1. A cane harvester including a wheeled supporting frame, a cutter beam including a rear wall, a top wall, a bottom wall, a front wall, and an outer end wall, a plurality of longitudinally extending bars mounted in the corners defined by said walls, and a plurality of cutting elements mounted in the cutter beam, means for actuating the cutting elements, supporting rods extending from the wheeled frame, an axle passing through certain of said rods and through the terminals of the bars at the upper corners of the cutter beam for pivotally supporting the cutter beam, and a locking rod adapted to be passed through certain other of the rods and through the bars at the lower corner of the cutter beam for maintaining the cutter beam against swinging movement when the same is horizontally disposed for use.

2. A harvester including a wheeled supporting frame, a cutter beam, cutting elements carried by the beam, means for actuating said elements, extensions carried by the inner end of the beam in vertical relation, supporting rods extending from the wheeled frame, an axle passing through certain of said rods and through the upper extensions of the beam for pivotally supporting said beam, and a locking rod adapted to be passed through certain other of the rods and through the lower extensions of the beam for maintaining the beam against swinging movement when the same is horizontally disposed for use.

In testimony whereof I hereunto affix my signature in the presence of two witnesses.

VACLAV J. VITEK.

Witnesses:
    MARY GEORGE,
    CHAS. L. McFADDEN.